UNITED STATES PATENT OFFICE.

EUGENE D. WELWOOD, OF PITTSBURGH, PENNSYLVANIA, ASSIGNOR TO PORCELA-RADAX COMPANY, OF PITTSBURGH, PENNSYLVANIA, A CORPORATION OF PENNSYLVANIA.

CLEANING-POWDER.

1,117,732.  Specification of Letters Patent.   Patented Nov. 17, 1914.

No Drawing.   Application filed May 29, 1914.   Serial No. 841,941.

*To all whom it may concern:*

Be it known that I, EUGENE D. WELWOOD, citizen of the United States, residing at Pittsburgh, in the county of Allegheny, State of Pennsylvania, have invented certain new and useful Improvements in Cleaning-Powder, of which the following is a specification.

The object of this invention is to provide a compound in the form of a powder, to be used for cleaning the inner surfaces of porcelain or vitreous china water-closet bowls and other vessels in which water is used, said compound being composed of or including chemical ingredients which have the property of combining with and rendering soluble and easily removable, the mineral deposits from the water which have accrued upon the surfaces to be cleaned and from unsightly and otherwise objectionable discolorations.

The natural water supply of many cities and towns is found to contain certain calcium salts with or without iron salts, which become gradually deposited on the surface of porcelain or vitreous china water-closets and other fixtures causing discoloration and stain which are difficult to remove on account of insolubility of the deposited salts in water alone. The use of abrading materials is objectionable as they are liable to roughen the vitreous or porcelain surface, while the use of hydrochloric or other strong acids, as heretofore proposed, is not only offensive on account of the vapors given off but irritating and dangerous.

I propose to overcome the difficulties and objections incident to the use of other chemical cleaning compositives or materials, by the use of a powder composed of or containing in suitable proportions, sodium sulfate and calcium chlorid the preferred proportions and form being about three parts more or less of finely granulated acid sodium sulfate—or niter cake and one part of granulated calcium chlorid. These when mixed together, with or without other unobjectionable materials, form a compound or preparation in the form of a powder which can be conveniently and safely handled and applied and will accomplish the desired results, but which is only active in the presence of water or moisture.

To use the preparation it is necessary to first flush or thoroughly moisten the closet bowl or other fixture on which it is to be used, and after flushing, a small quantity of the preparation is sprinkled into the water that remains in the bowl, and also a small quantity is sprinkled upon the bowl above the water line. The acid sodium sulfate in conjunction with the calcium chlorid generates muriatic acid and dissolves more lime than acid sodium sulfate does when used alone.

The increased solubility resulting from the use of calcium chlorid in combination with the acid sodium sulfate is caused by the fact that the presence of the calcium chlorid increases the solubility in water of the calcium sulfate which is formed by the action of the acid sodium sulfate upon the calcium carbonates present in the deposit or secretion made by the water. The sediment which may be in the closet bowl after the action of the powdered composition is easily removed by again flushing the bowl if necessary or by slightly wiping off the inner surface of the bowl.

It is not intended to limit the scope of the invention to the particular proportions of the ingredients set forth, nor to the use of the particular ingredients without the presence of other elements; for it will be understood that the exact proportions may be modified to correspond with varying conditions.

I claim:

A cleaning powder including a mixture of acid sodium sulfate and calcium chlorid.

In testimony whereof I affix my signature in presence of two witnesses.

EUGENE D. WELWOOD.

Witnesses:
 GEORGE WRIGHT, Jr.,
 H. B. ROWLEY.

Copies of this patent may be obtained for five cents each, by addressing the "Commissioner of Patents, Washington, D. C."